L. J. DUMAINE.
INDICATOR FOR SUNKEN VESSELS.
APPLICATION FILED OCT. 6, 1917.
1,287,580.
Patented Dec. 10, 1918.
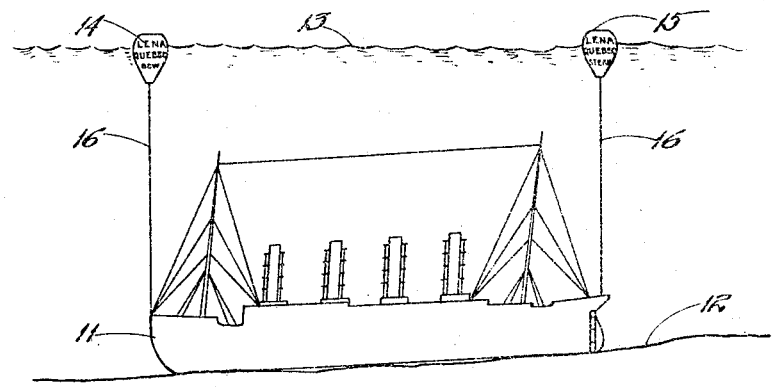
Fig. 1.
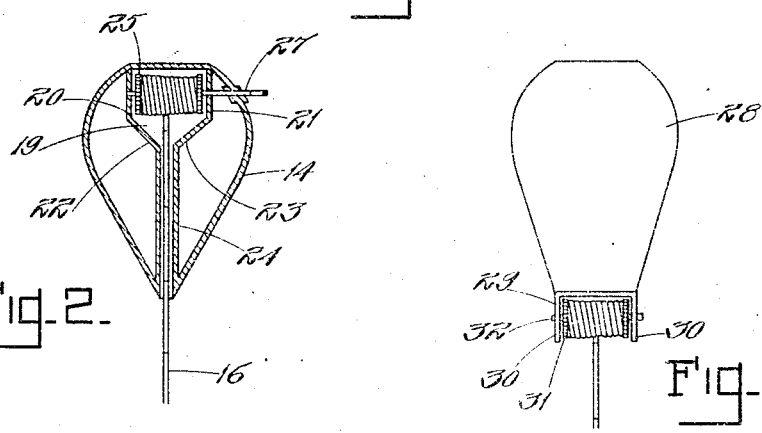
Fig. 2.
Fig. 3.
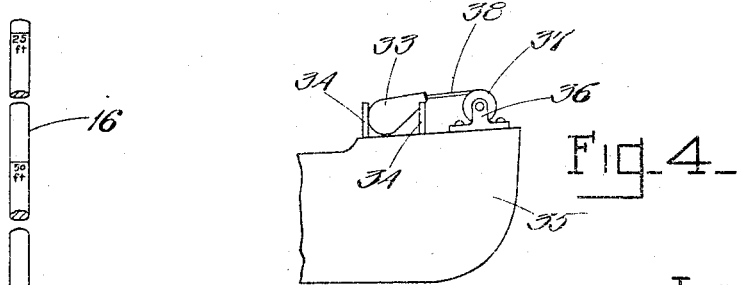
Fig. 5.
Fig. 4.
INVENTOR
Louis J. Dumaine
by MacLeod, Calver, Copeland & Dike
Attys.

UNITED STATES PATENT OFFICE.

LOUIS JOSEPH DUMAINE, OF MONTREAL, QUEBEC, CANADA, ASSIGNOR OF ONE-HALF TO VICTOR DUMAINE, OF MONTREAL, QUEBEC, CANADA.

INDICATOR FOR SUNKEN VESSELS.

1,287,580.  Specification of Letters Patent.  Patented Dec. 10, 1918.

Application filed October 6, 1917. Serial No. 195,136.

*To all whom it may concern:*

Be it known that I, LOUIS JOSEPH DU-MAINE, a citizen of the United States, residing at Montreal, Province of Quebec, Dominion of Canada, have invented a certain new and useful Improvement in Indicators for Sunken Vessels, of which the following is a specification, reference being had therein to the accompanying drawings.

My invention has for its object an indicator for sunken vessels which is adapted to be used in connection with a vessel either of the surface or submersible type. The indicator embodying my invention is of simple and inexpensive construction so that a vessel may be equipped with it at small cost. It is so arranged that if the vessel sinks the exact location of the vessel is indicated, together with the depth of the water in which it is sunk.

My invention will be fully understood from the following description when taken in connection with the accompanying drawings, and the novel features thereof will be pointed out and clearly defined in the claims at the close of this specification.

In the drawings, Figure 1 is a view of a sunken vessel showing the manner in which its position is indicated by the device embodying my invention.

Fig. 2 is a vertical section of one form of indicating device embodying my invention.

Fig. 3 is another form of indicating device embodying my invention.

Fig. 4 shows one end of a vessel which is provided with still another form of device embodying my invention.

Fig. 5 shows the type of anchor line with which a device embodying my invention is provided.

Having reference to the drawings and particularly to Fig. 1, at 11 is shown a sunken vessel of any common type which is resting on the bottom 12 and is entirely submerged beneath the surface of the water which is indicated at 13. At 14 and 15 are indicating devices or buoys which are adapted to float on the surface of the water and are herein shown as connected with the bow and stern of the vessel 11 by anchor lines 16. One of the buoys is labeled "Bow" and the other is labeled "Stern" so as to indicate the way in which the vessel is lying on the bottom. If the vessel carries a buoy amidship it can be properly marked also. Furthermore the buoys preferably bear the name of the vessel and its nationality as for example as shown in Fig. 1. The vessel 11 may be of the surface type as shown, or of the submersible type and may be provided with one or more indicating devices as desired.

Having reference to Fig. 2 of the drawings, the indicating device consists of a buoy 14 which may be of any convenient shape and which is so arranged that it will float with its upper portion above the surface of the water so that it may be readily seen. The buoy 14 which is preferably of sheet metal or like material and hollow, has sufficient buoyancy to carry the load required of it and to float well above the surface of the water, as will be hereinafter more fully set forth. Within the buoy 14 is a spool compartment 19 which is located at the upper end of the buoy. It has parallel vertical walls 20 and 21, and downwardly inclined walls 22 and 23 which are connected with the upper end of a tubular member 24 by which the interior of the chamber 19 is connected with the exterior of the buoy at its lower end. Within the chamber 19 is a spool 25, of any common form, carrying an anchor line 16 and mounted on a shaft 27 which is journaled in the walls 20 and 21 and projects through the outer surface of the buoy 18 as shown. The shaft 27 is preferably provided with a squared end so that the anchor line may be wound up on the spool by a suitable crank not shown.

The anchor line 16 is preferably of the type shown in Fig. 5 and is labeled with a series of numbers by which the length of the line unwound from the spool, and therefore the depth of water in which the vessel is sunk, may be readily determined as will be described. The free end of the line 16 passes through the passage in the tubular member 24 and thence out at the lower end of the buoy 14. When the device is applied to a vessel the line 16 is attached at any convenient point and the buoy is placed at a position on the vessel from which it can float on the surface of the water in case the vessel should sink. The chamber 19 is so arranged that the line will be unwound from the spool and be drawn out through the passage formed by the member 24 without danger of clogging. The walls 23 and 24 incline downwardly, as referred to, in order that the line will have a smooth surface to pay out upon whether it is being drawn off from the center of the spool or from its ends. In this way the line cannot become caught and draw down the buoy with the vessel. Furthermore, the buoy is arranged so that it will float with that portion of the chamber 19 in which the spool 25 is located entirely above the water. The spool is thus kept dry so that the line will unwind freely. The buoy may be readily seen on the surface of the water and indicates the exact position of the sunken vessel as also the depth of the water in which it is submerged as determined by the amount of line which has been unwound from the spool and which for this purpose has been labeled as referred to.

Having reference to Fig. 3 there is shown another form of buoy embodying my invention which consists of a body portion 28, which is preferably hollow, and is provided at its lower end with a spool carrying bracket 29 having downwardly projecting parallel sides 30. A spool 31 carrying an anchor line is mounted on a shaft 32 which is journaled in the sides 30. In this form of device also the spool 31 is unwound as the vessel sinks and leaves the buoy 28 floating on the surface. There is no danger of the line becoming caught for the line is free from all obstructions and is carried free from the vessel with the buoy.

In Fig. 4 is still another form of indicating device. In this case the buoy 33 is preferably held in brackets 34 on the prow 35 or other desired portion of the vessel. The brackets or buoy holder 34 are so arranged that when the vessel sinks the buoy 33 will float off. Secured to the vessel is a spool holder or bracket 36 in which is journaled a spool 37 carrying a line 38 which is secured to one end of the buoy 33. When the vessel sinks below the surface of the water the buoy 33 floats off of the holder 34 and as the vessel goes down the spool 37 is unwound so that when the vessel reaches the bottom the buoy 33 floats on the surface and indicates its exact position.

What I claim is:

1. An indicating device for sunken vessels comprising a buoy which is hollow substantially throughout its interior forming a large hollow chamber, a hollow spool chamber in the upper portion of the main chamber of the buoy of less size than the main buoy chamber, said spool chamber having walls which make a closed chamber within the said larger main chamber, a tube leading from the bottom of said spool chamber out through the lower end of the buoy, a shaft journaled in the side walls of the said spool chamber, and a line coiled around said spool, one end of the line being made fast to the spool and the other end of the line extending down through the said tube.

2. An indicating device for sunken vessels comprising a buoy which is hollow substantially throughout its interior forming a large hollow chamber, a hollow spool chamber in the upper portion of the main chamber of the buoy of less size than the main buoy chamber, said spool chamber having walls which make a closed chamber within the said larger main chamber, a tube leading from the bottom of said spool chamber out through the lower end of the buoy, a shaft journaled in the side walls of said spool chamber, a line coiled around said spool one end of the line being made fast to the spool and the other end of the line extending down through the said tube, the said shaft passing out through the side walls of the spool chamber and the side wall of the buoy and being shaped on its projecting outer portion for connection with mechanism for rotating the shaft.

3. An indicating device for sunken vessels comprising a buoy which is hollow substantially throughout its interior forming a large hollow chamber, a hollow spool chamber in the upper portion of the main chamber of the buoy of less size than the main buoy chamber, said spool chamber having walls which make a closed chamber within the said larger main chamber, a tube leading from the bottom of said spool chamber out through the lower end of the buoy, a shaft journaled in the side walls of said spool chamber, a line coiled around said spool one end of the line being made fast to the spool and the other end of the line extending down through the said tube, the said shaft passing out through the side walls of the spool chamber and the side wall of the buoy, its outer projecting portion being non-circular in cross section to enable it to receive a crank for rotating it.

In testimony whereof I affix my signature.

LOUIS JOSEPH DUMAINE.

Copies of this patent may be obtained for five cents each, by addressing the "Commissioner of Patents, Washington, D. C."